Jan. 11, 1938.   F. L. SCOTT   2,104,822
DRILL CUTTER
Original Filed April 24, 1935
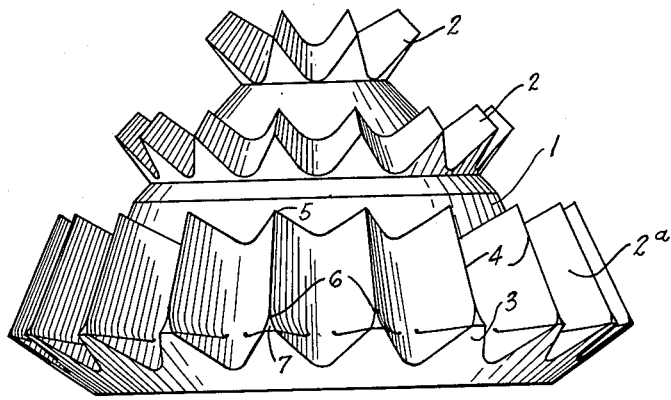
Fig. 1
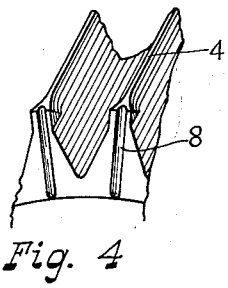
Fig. 4
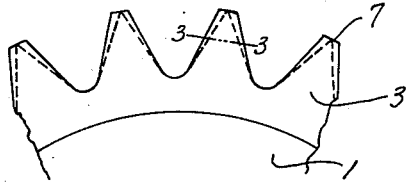
Fig. 2
Fig. 5
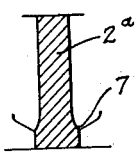
Fig. 3
Floyd L. Scott
INVENTOR
BY Jesse R. Stone
ATTORNEY Patented Jan. 11, 1938

2,104,822

UNITED STATES PATENT OFFICE 2,104,822

DRILL CUTTER

Floyd L. Scott, Houston, Tex., assignor to Hughes Tool Company, Houston, Tex., a corporation of Texas Substitute for abandoned application Serial No. 17,973, April 24, 1935. This application July 30, 1936, Serial No. 93,454

7 Claims. (Cl. 255—71)

My invention relates to roller boring drills for use in deep well drilling, and pertains particularly to the construction of the cutters employed on the drill.

A difficulty with most roller boring drills is that the cutters wear rapidly along the gage surface that cuts along the wall of the hole. This results in a reduction in diameter of the well hole as the drill progresses in drilling. Sometimes the gage of the well bore is reduced by this wear of the cutters, so that an expensive amount of reaming must be done to bring the hole back to the required gage before a new set of cutters can get to the well bottom.

It is an object of my invention to provide a drill cutter which has its teeth formed to resist wear at the gage surface and thus overcome the objection of reduction in gage of the hole before the cutting teeth are worn out and thus ineffective to cut the bottom of the hole.

I desire to provide a wide area along the base of the cutter and along its outer gage-cutting surface which allows the using of hard facing inserts to resist wear and also to provide a larger amount of metal at that point to be worn away during the time that the cutting edge is being dulled.

In the drawing, Fig. 1 is a side elevation of a well drill cutter of common construction with my invention employed thereon.

Fig. 2 is a broken end view of the gage surface of a cutter.

Fig. 3 is a section on the plane 3—3 of Fig. 2.

Figs. 4 and 5 are end views of teeth showing provision for hard facing inserts.

I have illustrated the invention as applied to an approximately conical shaped cutter 1 having circumferential rows of cutting teeth 2 thereon. The row of teeth 2ᵃ adjacent the base of the cone has the outer ends of said teeth shown at 3 widened along the gage surface.

Thus said teeth 2ᵃ are cut along their lengths to form a sharp edge 4 extending from the inner end 5 to a point 6 spaced slightly from the outer end. At this point the teeth are thickened at 7 so that the outer end of each tooth has a flattened crest as shown best in Figs. 2 and 5.

The outer end face 3 of the row of teeth 2ᵃ bears against the wall of the hole in operation and it will be seen that there is sufficient stock in each tooth at this end so that it may receive a substantial amount of hard facing material to resist wear. Also the outer cutting end of each tooth will wear longer because of the greater amount of material in the tooth to resist the abrasion caused by rubbing the wall of the hole. This area will, therefore, endure under the abrasion of drilling as long as will the cutting edges 4 which disintegrate the bottom of the hole.

In Figs. 4 and 5 I have illustrated the manner in which inserts of hard facing material may be employed. I form grooves 8 or 8' in the end of each tooth, said grooves extending along the end of the tooth for the full length of the gage surface. The grooves may be narrow and of uniform width as shown at 8 or they may be wider and deeper as shown at 8'. In both cases the grooves open at the crest of the teeth so that the hard material will be exposed to contact with the bottom of the hole. The wide crest at 7 will wear sharper as the cutter progresses and the gage of the cutter will be much longer maintained.

By the use of a cutter formed as described, it is possible to reduce the amount of reaming to a minimum. The amount of time ordinarily spent in reaming is, therefore, saved, and the drilling of the well is hence less costly. It will be seen that although the track cut by the outer end of each cutter is longer than that of any other portion of the tooth, it has a larger amount of material to be worn at the outer end. The large end of the tooth admits of the welding therein of the wear resisting inserts of hard facing material, as is not possible with the narrow ends in the teeth as normally formed.

This is a refiling of abandoned application Serial No. 17,973, filed April 24, 1935.

What I claim as new is:

1. A well drill, rolling cutters thereon positioned to cut the bottom and the side wall of the hole, teeth on said cutters the crests of which are of uniform width except at the outer ends, said outer ends of said crests being widened abruptly to provide a wide outer cutting area to bear against and cut the side wall of the hole.

2. A well drill, rolling cutters thereon, said cutters having teeth thereon with the sides thereof sloping uniformly to a sharp cutting edge except at the outer end which is adapted to cut the side wall of the hole, said outer end being widened materially to form a flat crest of approximately triangular shape and a wide hard faced area the smaller end of which is truncated, said area being presented against the side wall of the hole.

3. A cutter for well drills, a row of cutting teeth thereon for cutting both the bottom and the side walls of the well, crests on said teeth of uniform width except at the outer end which is widened abruptly to form a wide outer gage-cutting area the outer end of which is comparatively wide for engaging the side wall of the hole.

4. A cutter for well drills, a row of cutting teeth thereon, said teeth having sharp crests thereon except at the outer end where said teeth are widened to form a flat area at the crest and a wide end area to engage and cut the side wall of the well.

5. A cutter for well drills, a row of cutting teeth thereon, said teeth having sharp crests thereon except at the outer end where said teeth are widened to form a flat area at the crest and a wide end area to engage and cut the side wall of the well, and hard facing inserts set in the outer ends of said teeth.

6. A cutter such as is set out in claim 5 in which the hard facing inserts extend along the entire gage surface of the teeth and are exposed for cutting at the crests of said teeth.

7. An approximately conical shaped drill cutter, circumferential rows of teeth thereon, the outer row at the base of said cutter cutting the gage surface and having a sharp crest except at the outer end where it is widened, and an insert of hard material embedded in said gage cutting portion and forming part of the crest of the tooth.

FLOYD L. SCOTT.